United States Patent [19]

Williams

[11] Patent Number: 4,540,729

[45] Date of Patent: Sep. 10, 1985

[54] POLYESTER MOULDING COMPOSITIONS

[75] Inventor: Richard S. Williams, Bromsgrove, England

[73] Assignee: BIP Chemicals Limited, Manchester, England

[21] Appl. No.: 650,082

[22] Filed: Sep. 13, 1984

[30] Foreign Application Priority Data

Sep. 16, 1983 [GB] United Kingdom ............... 8324879

[51] Int. Cl.³ .................. C08L 67/02; C08K 3/40; C08K 5/09
[52] U.S. Cl. .................. 524/114; 260/DIG. 35; 524/539; 525/411
[58] Field of Search ............... 524/114, 539; 525/411; 260/DIG. 35

[56] References Cited

U.S. PATENT DOCUMENTS 3,632,402  1/1972  Weissermel et al. ............... 177/100
3,835,089  9/1974  Fox et al. ............... 525/411
3,892,821  7/1975  Koleske et al. ............... 525/411
4,212,791  7/1980  Avery et al. ............... 260/40

FOREIGN PATENT DOCUMENTS

EP57415    8/1982  European Pat. Off. ............ 525/411
EP73042    3/1983  European Pat. Off. .... 260/DIG. 35
58-129045  8/1983  Japan ................... 525/411
1321129    6/1973  United Kingdom .
2021131   11/1979  United Kingdom .

Primary Examiner—Ronald W. Griffin
Attorney, Agent, or Firm—Cushman, Darby & Cushman

[57] ABSTRACT

A moulding composition comprises a polyethylene terephthalate with a nucleant, polycaprolactone of molecular weight above 10,000 and an epoxidized unsaturated triglyceride. The amount of epoxidized triglyceride is preferably not more than 10 parts per 100 parts total polymer and the amount of polycaprolactone is preferably 2.5 to 25 parts per 100 parts total polymer.

11 Claims, No Drawings

POLYESTER MOULDING COMPOSITIONS

The invention relates to polyester compositions, particularly those based on polyethylene terephthalate (PET).

The combination of PET with high molecular weight polycaprolactone and suitable nucleants as described in our UK patent application No. 83 19627 gives a moulding material with superior mould release and lower mould temperature requirements and also superior impact strength, particularly in glass fibre filled compositions. Further reductions in the mould temperature required for glossy mouldings can be achieved by the addition of suitable plasticizers but these generally cause a drop in the impact strength. For instance, dibenzyl adipate, dibenzyl azelate, neopentyl glycol dibenzoate and polyethylene glycols all act as suitable plasticizers lowering mould temperature for glossy mouldings but they all reduce the impact strength of the moulding so produced.

Thus it is highly desirable to find a means of lowering the mould temperature required without an accompanying penalty in loss of impact strength.

EP No. 073 042 discloses the use of epoxidised plasticizers in improving the moulding capacity of PET compositions and suggests that they have a synergistic effect with some nucleants, including sodium stearate. There is no discussion in this specification concerning impact strengths, and no disclosure of use of polycaprolactones.

According to the present invention a polyester moulding composition comprises polyethylene terephthalate or a polyester containing at least 80% of polyethylene terephthalate repeating units, polycaprolactone having a number average molecular weight of above 10,000, a nucleant for crystallization of the polyethylene terephthalate and an epoxidised unsaturated triglyceride containing at least one epoxide group.

The epoxidised unsaturated triglyceride functions as a plasticizer to improve the mouldability of the composition but we have found that when used in these compositions in conjunction with the high molecular weight polycaprolactone these compounds further improve the impact strength of the composition, an effect opposite to that normally produced by such use of plasticizer.

The epoxidised unsaturated triglyceride may be an individual compound or mixture of compounds. Examples of unsaturated triglycerides which may be epoxidised include linseed oil, soybean oil, sunflower seed oil, safflower oil, hempseed oil, tung oil, oiticica oil, corn oil, sesame oil, cottonseed oil, castor oil, olive oil, peanut oil, rapeseed oil, coconut oil, babassu oil, palm oil and the like.

It is preferable that the epoxidised unsaturated triglyceride should be relatively non-volatile because of the processing conditions used to compound the PET composition. Perferably the molecular weight of the epoxidised unsaturated triglyceride is at least 400.

The particularly preferred triglyceride is mono-epoxidised soybean oil.

The composition may contain a reinforcing fibre, for example short lengths of reinforcing fibre such as glass fibre, although other types of fibre which will stand up to the processing conditions to which the composition is subjected may be used.

The nucleant may be either a metal salt of an organic acid, for example a metal stearate, acetate or benzoate, or a finely divided material which does not melt at or below the melting point of polyethylene terephthalate, for example microtalc. The preferred nucleant is a group 1 metal stearate, or microtalc with a particle size of less less 20 microns.

Preferably the group I metal stearate is sodium stearate, which is a known nucleant for polyethylene terephthalate and gives easier nucleation of the polyester. The nucleant is preferably used in an amount no more than 1% by weight of the composition, particularly in the range 0.1 to 0.7% by weight. However, if a finely divided solid nucleant is used it may be used in greater proportion, eg up to six parts by weight per 100 parts by weight total polymer, and may be used, if desired, in addition to a nucleant of the other type.

The polycaprolactone is an aliphatic polyester which has a repeat unit of $-[-CO-(CH_2)_5-O-]_n-$, the end groups depending upon the initiator used to start polymerisation of the caprolactone. In the present invention, the caprolactone polymers have a number average molecular weight above 10,000, for example in the range 10,000 to 300,000.

Preferably the polycaprolactones have a number average (N A) Molecular weight of at least 20,500 and preferably also a N A molecular weight not greater than 100,000.

The amount of the polycaprolactone in the composition will generally be at least 2.5 parts by weight per 100 parts by weight total polymer and may, if desired, be substantial e.g. up to 25 parts by weight per 100 parts by weight total polymer. (By 'total polymer' in this specification we mean the total of polyethylene terephthalate based polyester plus the higher molecular weight polycaprolactone).

The total amount of epoxidised unsaturated triglyceride used as plasticizer will not generally be more than 10 parts by weight per 100 parts by weight of total polymer and preferably is in the range 1 to 6 parts by weight per 100 parts by weight of total polymer.

The invention will now be described more particularly by means of examples.

EXAMPLES

In these examples the following are the materials which were used in the various compositions:

| Fibre Grade | Polyethylene Terephthalate | PET (FG) (from Courtaulds). |
|---|---|---|
| Bottle Grade | " | PET (BG) (Melinar B90' from ICI) |

Glass Fibre (ECO 680 3 mm chopped strand from T-Glass Fibres Limited)
Polycaprolactone—CAPA 601P (NA molecular weight 47,000 from Interox Chemicals Ltd)
Epoxidised Soybean oil—Drapex 6.8 (from Argus Chemical Corporation)
Epoxidised Soybean oil—Estabex 2307 (from AKZO Chemie)
Sodium stearate
Neopentyl glycol dibenzoate (NPGDB)

In each example all the ingredients of the composition were mixed together and then compounded on a twin screw (Welding Engineers) extruder. The amounts of glass fibre are quoted as percentages by weight of the total composition.

EXAMPLES 1 TO 3

These examples show the effect of adding two different plasticizers to a PET composition containing 90 parts by weight of PET (FG), 10 parts by weight of CAPA 601P, 0.5 parts by weight sodium stearate, and 20% glass fibre. The type and amount of plasticizer used and the physical properties of test mouldings made from the compositions are given below in Table 1*.

TABLE 1

| Example No | 1 | 2 | 3 |
|---|---|---|---|
| Plasticizer Type | — | Drapex 6.8 | NPGDB |
| Pts Wt Plasticizer | — | 3 | 3 |
| Tensile Strength MPa | 91 | 95 | 73 |
| Tensile Modulus GPa | 6.3 | 6.7 | 7.1 |
| Flexural Strength MPa | 134 | 154 | 136 |
| Flexural Modulus GPa | 6.5 | 6.3 | 6.6 |
| CNIS KJ/m$^2$ | 6.9 | 9.2 | 5.4 |
| CUIS KJ/m$^2$ | 25 | 30 | 15 |

EXAMPLES 4 TO 6

These examples show the effect of the plasticizer Estabex 2307 in compositions with polycaprolactone. The basic composition in each Example was 90 parts by wt PET (FG) and 0.5 parts by wt of sodium stearate, with 20% glass fibre. Details are given below in Table 2*.

TABLE 2

| Example No | 4 | 5 | 6 |
|---|---|---|---|
| Pts CAPA 601P | — | 10 | 10 |
| Pts Estabex | 3 | — | 3 |
| Tensile Strength MPa | 99 | 76 | 88 |
| Tensile Modulus GPa | 7.8 | 7.0 | 7.3 |
| Flexural Strength MPa | 164 | 122 | 136 |
| Flexural Modulus GPa | 6.7 | 5.8 | 5.5 |
| CNIS KJ/m$^2$ | 5.4 | 5.5 | 10.2 |
| CUIS KJ/M$^2$ | 20 | 16 | 27 |

It will be noted that the impact strength in Example 6 is markedly improved over that in both Examples 4 and 5, showing the value of combining the polycaprolactone and the epoxidised soybean oil.

EXAMPLES 7 TO 9

These examples are similar 4 to 6 except that a 30% glass level was used in the compositions. Details are given below in Table 3*.

TABLE 3

| Example No | 7 | 8 | 9 |
|---|---|---|---|
| Pts CAPA 601P | — | 10 | 10 |
| Pts Estabex | 3 | — | 3 |
| Tensile Strength MPa | 133 | 105 | 111 |
| Tensile Modulus GPa | 11.0 | 9.0 | 9.4 |
| Flexural Strength MPa | 189 | 162 | 164 |
| Flexural Modulus GPa | 9.2 | 8.2 | 8.1 |
| CNIS KJ/m$^2$ | 8.0 | 8.3 | 12.5 |
| CUIS KJ/m$^2$ | 26 | 25 | 47 |

It will be noted that here again is marked improvement in impact strength in the use of two additives in conjunction.

EXAMPLES 10 AND 11

These examples show the use of the epoxidised soybean oil in a bottle grade PET. In these examples the basic composition was 90 parts by wt PET (BG), 10 parts by wt of CAPA 601P and 0.5 parts by wt of sodium stearate with 15% of glass fibre. A marked improvement in the unnotched impact strength only is obtained in this case. Details are given below in Table 4*.

TABLE IV

| Example No | 10 | 11 |
|---|---|---|
| Pts Estabex | — | 3 |
| Pts CAPA 601P | 10 | 10 |
| Tensile Strength MPa | 74 | 78 |
| Tensile Modulus GPa | 5.2 | 6.1 |
| Flexural Strength MPa | 129 | 127 |
| Flexural Modulus GPa | 4.6 | 4.8 |
| CNIS KJ/m$^2$ | 12.2 | 11.6 |
| CUIS KJ/M$^2$ | 21 | 37 |

*In all the above tables 'CNIS' means 'Charpy Notched Impact Strength' and 'CUIS' means 'Charpy Unnotched Impact Strength'

I claim:

1. A polyester moulding composition which comprises polyethylene terephthalate, or a polyester containing at least 80% of polyethylene terephthalate repeating units, polycaprolactone having a number average molecular weight over 10,000, a nucleant for crystallisation of the polyethylene terephthalate and an epoxidised unsaturated triglyceride containing at least one epoxide group.

2. A composition according to claim 1 in which the epoxidised unsaturated triglyceride is an individual compound.

3. A composition according to claim 2 in which the compound is mono-epoxidised soybean oil.

4. A composition according to claim 1 in which the nucleant comprises a metal salt of an organic acid.

5. A composition according to claim 1 or 4 in which the nucleant comprises a finely divided solid material which does not melt at or below the melting point of polyethylene terephthalate.

6. A composition according to claim 1 in which the amount of polycaprolactone is in the range 2.5 to 25 parts per 100 parts by weight of total polymer.

7. A composition according to claim 1 in which the polycaprolactone has a number average molecular weight of at least 20,500.

8. A composition according to claim 1 in which the amount of epoxidised unsaturated triglyceride is not more than 10 parts by 100 parts by weight of total polymer.

9. A composition according to claim 8 in which the amoount of epoxidised unsaturated triglyceride is in the range 1 to 6 parts by weight per 100 parts by weight total polymer.

10. A composition according to claim 1 which includes a reinforcing fibre.

11. A polyester moulding composition which comprises a polyester containing 80% to 100% of polyethylene terephthalate repeating units, 2.5 to 25 parts by weight of a polycaprolactone having a number average molecular weight of at least 20,500, 0.1 to 6 parts by weight per 100 parts by weight of total polymer of a nucleant for crystallisation of the polyethylene terephthalate, and 1 to 6 parts by weight of an epoxidised unsaturated triglyceride containing at least one epoxide group.

* * * * *